(12) United States Patent
Pellerite et al.

(10) Patent No.: US 8,092,904 B2
(45) Date of Patent: Jan. 10, 2012

(54) OPTICAL ARTICLE HAVING AN ANTISTATIC LAYER

(75) Inventors: Mark J. Pellerite, Woodbury, MN (US); Eileen M. Flaherty Haus, St. Paul, MN (US); Tzu-Chen Lee, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 777 days.

(21) Appl. No.: 11/278,172

(22) Filed: Mar. 31, 2006

(65) Prior Publication Data
US 2007/0231561 A1    Oct. 4, 2007

(51) Int. Cl.
*B32B 15/02*    (2006.01)
*B32B 5/16*    (2006.01)

(52) U.S. Cl. ........ 428/323; 428/336; 428/368; 428/408; 977/952; 359/896

(58) Field of Classification Search ......................... None
See application file for complete search history.

(56) References Cited

U.S. PATENT DOCUMENTS

| | | | |
|---|---|---|---|
| 4,568,445 A | 2/1986 | Cates et al. | |
| 4,721,377 A | 1/1988 | Fukuda et al. | |
| 4,812,032 A | 3/1989 | Fukuda et al. | |
| 5,407,603 A | 4/1995 | Morrison | |
| 5,424,054 A | 6/1995 | Bethune et al. | |
| 5,424,339 A | 6/1995 | Zanka et al. | |
| 5,427,835 A | 6/1995 | Morrison et al. | |
| 5,466,567 A * | 11/1995 | Anderson et al. | 430/530 |
| 5,540,978 A | 7/1996 | Schrenk | |
| 5,751,388 A | 5/1998 | Larson | |
| 5,783,120 A | 7/1998 | Ouderkirk et al. | |
| 5,805,358 A | 9/1998 | Yamashita et al. | |
| 5,825,543 A | 10/1998 | Ouderkirk et al. | |
| 5,828,488 A | 10/1998 | Ouderkirk et al. | |
| 5,867,316 A | 2/1999 | Carlson et al. | |
| 5,882,774 A | 3/1999 | Jonza et al. | |
| 5,914,222 A * | 6/1999 | Morrison et al. | 430/510 |
| 5,932,626 A * | 8/1999 | Fong et al. | 522/182 |
| 6,042,752 A * | 3/2000 | Mitsui | 252/520.1 |
| 6,077,655 A * | 6/2000 | Majumdar et al. | 430/529 |
| 6,080,467 A | 6/2000 | Weber et al. | |
| 6,111,696 A | 8/2000 | Allen et al. | |
| 6,221,330 B1 | 4/2001 | Moy et al. | |
| 6,352,761 B1 * | 3/2002 | Hebrink et al. | 428/212 |
| 6,355,754 B1 | 3/2002 | Olson et al. | |
| 6,368,699 B1 | 4/2002 | Gilbert et al. | |
| 6,497,946 B1 * | 12/2002 | Kretman et al. | 428/317.9 |
| 6,577,358 B1 | 6/2003 | Arakawa et al. | |
| 6,734,262 B2 * | 5/2004 | Patel | 525/419 |
| 6,827,886 B2 | 12/2004 | Neavin et al. | |
| 6,846,089 B2 | 1/2005 | Stevenson et al. | |
| 6,893,731 B2 | 5/2005 | Kausch | |
| 7,038,746 B2 | 5/2006 | Tominagan et al. | |
| 7,041,365 B2 | 5/2006 | Kausch et al. | |
| 2003/0157317 A1 * | 8/2003 | Ito et al. | 428/323 |
| 2004/0229059 A1 | 11/2004 | Kausch et al. | |
| 2004/0265550 A1 * | 12/2004 | Glatkowski et al. | 428/209 |
| 2005/0024558 A1 | 2/2005 | Toyooka | |
| 2005/0083450 A1 | 4/2005 | Motomura et al. | |
| 2005/0147838 A1 | 7/2005 | Olson et al. | |
| 2005/0175827 A1 | 8/2005 | Hebrink et al. | |

FOREIGN PATENT DOCUMENTS

| | | |
|---|---|---|
| JP | 08-286004 | 11/1996 |
| JP | 10-029285 | 2/1998 |
| JP | 11-202104 | 7/1999 |
| JP | 2000-026817 | 1/2000 |
| JP | 2003-154616 | 5/2003 |
| JP | 2003-240910 | 8/2003 |
| JP | 2003-270633 | 9/2003 |
| WO | WO 2004/052559 A2 | 6/2004 |

OTHER PUBLICATIONS

Guo, T. et al., "Catalytic growth of single-walled manotubes by laser vaporization", *Chem. Phys. Lett.* 243: 1-12 (1995) pp. 49-54.
Thess A., et al. "Crystalline Ropes of Metallic Carbon Nanotubes", *Science*, 273: 483-487 (1996).
U.S. Appl. No. 11/283,307 entitled "Multi-function Enhancement Film" filed Nov. 18, 2005.

* cited by examiner

*Primary Examiner* — Timothy Speer
*Assistant Examiner* — Adam Krupicka
(74) *Attorney, Agent, or Firm* — Elizabeth A. Gallo

(57) ABSTRACT

Disclosed herein is an optical article having a first optical layer; a second optical layer; and an antistatic layer disposed between the first and second optical layers, the antistatic layer having conducting particles having an aspect ratio greater than about 10. The conducting particles may comprise vanadium oxide particles or carbon nanotubes. The optical article may be a brightness enhancement film, a retro-reflecting film, or a reflective polarizer, and be used in a display device, for example, a liquid crystal display device.

20 Claims, 2 Drawing Sheets

OPTICAL ARTICLE HAVING AN ANTISTATIC LAYER

FIELD OF THE INVENTION

The invention relates to an optical article having an antistatic layer, and particularly, to an optical article having an antistatic layer comprising conducting particles having a high aspect ratio.

BACKGROUND

Optical articles such as those used in display devices must meet stringent performance criteria including high light transmissivity, clarity, and ultra-clean appearance. Detrimental to optical performance are defects such as particles, non-planar topography, and disproportionate degree of contact (sometimes referred to as "wet-out"). These defects can be, in part, a result of static charges that are introduced by manufacturing, converting, or assembly processes.

For example, static charges can result from a tape (e.g. masking) or other film that is quickly pulled or peeled away from the target substrate/film during processing. These static charges can subsequently attract particles of dust or other debris that may be near the surface of a film. Particles that eventually land or become anchored on the film can lead to unwanted light blockages, refracting, or absorbance, depending on the film's original purpose. A non-planar topography can be the result of non-uniform shrinkage, warping, or expansion of a film, particularly when an area of the film is pinched or mechanically held in place while movement or creep occurs with another portion of the film. Another cause, however, may be static charges that can create the pinched or stationary area, causing binding between film layers and consequently lead to non-uniform or non-synchronized film changes. The optical defect known as the "wet-out" phenomenon can occur when differences in optical transmission exist between two regions, or when interference patterns such as "Newton's rings" are observed. (The defect is minimally detectable when the wet-out is uniform throughout a film product.) Static charges can contribute to non-uniform attraction of particular areas between two layered films, causing wet-out.

Accordingly, it is desirable to obtain optical articles having improved antistatic properties with little or no detrimental effects on optical performance.

SUMMARY

Disclosed herein is an optical article comprising a first optical layer; a second optical layer; and an antistatic layer disposed between the first and second optical layers, the antistatic layer comprising conducting particles having an aspect ratio greater than about 10. The antistatic layer may consist essentially of the conducting particles and a surfactant, such as vanadium oxide particles or carbon nanotubes, and a nonionic surfactant. The optical article may be a brightness enhancement film, a retro-reflecting film, or a polarizer. The optical article may be used in a display device, for example, a liquid crystal display device.

When conducting particles having an aspect ratio greater than about 10 are incorporated into an optical article as described herein, an optical article having a charge decay time of less than about 2 seconds may be obtained with typically little or no detrimental effect on adhesion between the first and second optical layers. In addition, the conducting particles, even though they may be up to about 100 um in at least one dimension, have little or no effect on optical performance of the optical article.

DETAILED DESCRIPTION

Optical articles according to the embodiments described herein can exhibit high resistivity values, yet sustain effective antistatic properties. For clarity, it is noted that although the term "conductive" is often used in the industry to refer to "static dissipative", i.e., antistatic, the terms conductive and antistatic as used herein are not intended to be synonymous. Specifically, a conductive material coating is considered to have a surface resistivity up to $1\times10^5$ ohms/sq, whereas an antistatic material coating typically has a surface resistivity up to $1\times10^{12}$ ohms/sq. These terms are generally used to describe materials having a conductive or antistatic component or agent on an exposed surface of the material. Optical articles having an antistatic layer "buried" between optical layers having no antistatic properties may be made such that the optical article is antistatic, even though the articles exhibit higher levels of surface resistivity. Furthermore, the static decay times can be maintained even with these high surface resistivity values.

The optical articles disclosed herein are antistatic even in the absence of circuitry (e.g., wires) connected to the antistatic layer. Exemplary articles exhibit sufficient antistatic properties so as to prevent dust, dirt, and other particles from adhering to the surface(s) of the optical article. Surprisingly, the optical articles disclosed herein can exhibit a surface resistivity greater than about $1\times10^8$ ohms/sq, for example, $1\times10^{10}$ or greater, yet maintain their antistatic properties. In addition, the optical articles disclosed herein may exhibit static decay times of less than about 2 seconds.

The optical article disclosed herein comprises conducting particles having a high aspect ratio of greater than about 10. This high aspect ratio presumably leads to highly efficient formation of antistatic networks at extremely low add-on of particles. Under these conditions, in addition to not affecting adhesion between the first and second optical layers, this antistatic layer has minimal impact on optical performance of the finished article. This is surprising, given that they may be up to about 100 um in at least one dimension. Typically, immiscible particles of this size incorporated into optical articles have a detrimental impact on optical performance due to light scattering arising from refractive index mismatch.

Figure 1:
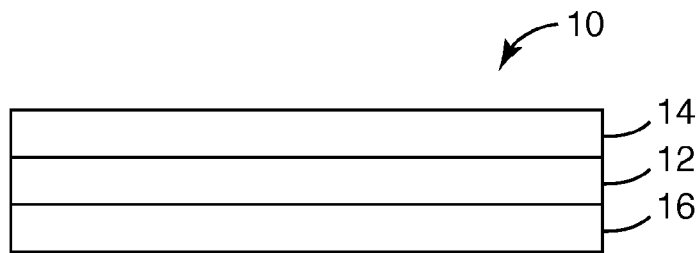
FIG. 1 shows a schematic cross-section of an exemplary optical article.

FIG. 1 shows one embodiment in which optical article 10 comprises antistat layer 12 disposed between and in substantial contact with first optical layer 14 and second optical layer 16. The components of the antistat layer may be described as being buried or sandwiched between two optical layers, or on the first optical layer and covered, overcoated, or overlaid with the second optical layer.

The antistatic layer comprises conducting particles having an aspect ratio greater than about 10, the aspect ratio determined by dividing the length of the particles by their diameter. In one embodiment, the conducting particles in the antistatic layer comprise vanadium oxide as described, for example, in U.S. Pat. No. 5,427,835 and references cited therein. The vanadium oxide particles may be referred to as colloidal particles, comprising single or mixed valance vanadium oxide such that the formal oxidation states of the vanadium ions are typically +4 and +5. Such species may be referred to as $V_2O_5$. In the aged colloidal form (several hours at 80° C. or more or several days at room temperature), vanadium oxide consists of dispersed fibrillar particles of vanadium oxide having a width of from about 0.02 to about 0.08 um and a length of from about 1.0 to about 4.0 um.

The vanadium oxide particles described above may be prepared in the form of colloidal dispersions, sometimes described as sols, as described in U.S. Pat. No. 5,427,835 and references cited therein. One example of a suitable method involves hydrolysis and condensation of vanadium oxoalkoxides. Vanadium oxoalkoxides may be prepared in situ from a precursor, such as vanadium oxyhalide or vanadium oxyacetate, and an alcohol. Examples of useful precursors include vanadium oxychloride, $VOCl_3$, and vanadium oxyacetate, $VO_2OAc$. Suitable alcohols include i-BuOH, i-PrOH, n-PrOH, n-BuOH, and t-BuOH.

The vanadium oxoalkoxide may be a trialkoxide of the formula $VO(OR)_3$, wherein each R is independently an aliphatic, aryl, heterocyclic, or arylalkyl group, for example, groups such as $C_{1-10}$ alkyls, $C_{1-10}$ alkenyls, $C_{1-10}$ alkynyls, $C_{1-18}$ aryls, $C_{1-18}$ arylalkyls, or mixtures thereof, which can be linear, branched, substituted, or unsubstituted, or cyclic. In particular, each R may independently be an unsubstituted $C_{1-6}$ alkyl. Heterocylic groups include one or more heteroatoms such as nitrogen, oxygen, or sulfur, for example, furan, thymine, hydantoin, and thiophene. Branched groups include substituents that do not interfere with the desired product, for example, Br, Cl, F, I, OH. Each R group may be independently selected, that is, not all R groups in the formula $VO(OR)_3$ are required to be the same. An example of a suitable vanadium oxoalkoxide is vanadium triisobutoxide oxide $VO(O-i-Bu)_3$. If the vanadium oxoalkoxide is generated in situ, it may be a mixed alkoxide having from one to three alkoxide groups. For example, the product of the in situ reaction of vanadium oxyacetate with an alcohol is a mixed alkoxide/acetate.

The hydrolysis and condensation reactions used to form the vanadium oxide particles can be carried out in water within a temperature range in which the solvent, which preferably is deionized water or a mixture of deionized water and a water-miscible organic solvent such as a low molecular weight ketone or an alcohol, is in a liquid form, e.g., within a range of about 0-100° C. A hydroperoxide such as $H_2O_2$ or t-butyl hydroperoxide may be used to improve dispersability of the particles and facilitate production of the antistatic layer with highly desirable properties. When used, the hydroperoxide is typically present in an amount such that the molar ratio of vanadium oxoalkoxide to hydroperoxide is from 1:1 to 4:1. Optionally, reaction can be modified by the addition of co-reagents, metal dopants, etc., subsequent aging or heat treatments, or removal of alcohol by-products. Useful concentrations of the colloidal dispersions are up to 5 wt % vanadium oxide particles.

In another embodiment, the conducting particles having an aspect ratio of at least 10 may comprise carbon nanotubes as described, for example, in WO 2004/052559 and references cited therein. The carbon nanotubes may be single-walled carbon nanotubes which may be viewed as a graphite sheet rolled up into a nanoscale tube. Useful single-walled carbon nanotubes may have a length of 100 um or less and a diameter of 2 nm or less. There may be additional graphene tubes around the core of a single-walled nanotube which are referred to as multi-walled carbon nanotubes. Useful multi-walled carbon nanotubes may have a length of 100 um or less and a diameter of 30 nm or less.

Chemical and physical variations of the carbon nanotubes as described in WO 2004/052559 may be employed in the antistatic layer. They may be in an aggregated form comprising bundles of tubes called ropes, and/or aggregates of ropes called snakes. The nanotubes, ropes, and/or snakes may form a network with sufficient open area so as not to adversely effect optical performance of the optical article. Small diameter ropes that have not fully integrated/merged into a network may be used as well. The carbon nanotubes may be oriented in some direction, for example, in the plane of the antistatic layer, or they may be in a random arrangement. The carbon nanotubes may also be bent, straight, or some combination thereof. In addition, they may be modified chemically to incorporate chemical agents or compounds, or physically to create effective and useful molecular orientations, or to adjust the physical structure of the nanotube.

A variety of methods are known for preparing single-walled carbon nanotubes. For example, U.S. Pat. No. 5,424,054 describes a method in which carbon vapor is produced by electric arc heating of solid carbon which is then contacted with a cobalt catalyst; the carbon vapor may also be produce by laser heating, electron beam heating, or RF induction heating. Another method involves the use of a high-temperature laser to simultaneously vaporize graphite rods and a transition metal as described in Guo, T. et al., Chem. Phys. Lett. 243: 1-12 (1995) and Theses, A., et al. Science, 273: 483-487 (1996). Still yet another method is described in U.S. Pat. No. 6,221,330 in which gaseous carbon feedstocks and unsupported catalysts are employed.

In general, the amount of conducting particles used in the antistatic layer will depend upon the particular particles being used, other components in the antistatic layer, the nature of the first and second optical layers, etc., as well as on the application in which the optical article is to be used. In most cases, it is desirable to minimize the amount of conducting particles used in order to minimize cost and any adverse effects on the performance of the optical article. For example, if the conducting particles are capable of imparting color to the optical article, and the optical article needs to be colorless, then the amount of conducting particles used in the antistatic layer should be minimized to the extent that the optical article remains colorless. Ionic materials such as quaternary ammonium salts are often used as colorless antistatic agents. However, their antistatic properties generally depend on absorption of water from their surroundings, resulting in humidity-dependent antistat behavior. In extreme cases, they can cease to function at all as antistats in extremely dry environments. Conducting materials are thus preferred in this regard, since their antistatic behavior is independent of ambient humidity. For another example, the amount of conducting particles used should not interfere with adhesion between the first and second optical layers. ASTM D 3359 is a well known method used to measure adhesion between two layers as described in the examples below, and it is typically desirable for the adhesion between the two layers to be at least 3.

One way to determine the amount of conducting particles required in the antistat layer is to form the layer on the substrate and then measure the surface resistivity; ideally the antistat layer has a surface resistivity of $1 \times 10^{10}$ ohms/sq or less, for example, about 1×10⁸ ohms/sq. Another useful parameter is charge decay time, that is, the amount of time it takes for a static charge to decay to 10% its initial value over a given range of voltage, e.g., 5000 V to less than 500 V. For most cases, the antistat layer has a charge decay time of less than about 2 seconds.

The antistatic layer may comprise a variety of components in addition to the conducting particles having an aspect ratio greater than about 10. In one embodiment, the antistatic layer consists essentially of the conducting particles and a surfactant, e.g., the latter may comprise greater than about 90 wt % of the total weight of the antistatic layer. The surfactant may be used to aid coatability of the aqueous dispersion which is dried to form the antistat layer. The ratio of surfactant:antistat in the layer may range from 1:1 to 100:1 by weight. Examples of suitable surfactants include nonionic surfactants such as the branched secondary alcohol ethoxylates available as Tergitol™ surfactants from Dow Chemical Co., and primary alcohol ethoxylates such as Tomadol® 25-9 from Tomah Chemical Co.

The antistatic layer may comprise a polymeric binder in order to facilitate coating or reduce streaking or reticulation of the layer upon drying. If used, the binder:antistat ratio is less than about 10:1 by weight. Suitable polymeric binders are materials that are compatible with the particles such that stable, smooth solutions or dispersions are formed with little or no agglomeration of the particles. The polymeric binder desirably does not interfere with the antistatic capacity of the particles. In general, polymeric binders can increase the surface resistivity of the resulting antistatic layer, and they may also give rise to hazy coatings due to the high (25-50 wt %) particle loadings required. Haze is known to have an adverse effect on optical performance, particularly optical gain. Thus, when used, an antistatic layer further comprising a polymeric binder preferably has an average total thickness of less than about 25 nm. With or without a polymeric binder, it may also be preferable for the antistatic layer to have an average total thickness of less than about 10 nm, with the conducting particles comprising an average nominal thickness of less than about 2 nm.

Typical binders may comprise a condensation or addition polymer, a blend thereof, or a polymer that is some combination thereof. Examples of condensation polymers include polyesters, polycarbonates, polyurethanes, polyamides, polyimides, and the like. Examples of addition polymers include poly(meth)acrylates, polystyrenes, polyolefins, cyclic olefins, epoxies, polyvinyl chloride, polyvinylidene fluoride, polyethers, cellulose acetates, and the like. The binder may also be crosslinked.

The antistatic coating formulation may be water- or solvent-based, although water-based is preferred because it avoids the need to handle flammable or combustible solvents and avoids emission of volatile organic compounds to the atmosphere.

The first and second optical layers are able to manage light such that the light is intentionally enhanced, manipulated, controlled, maintained, transmitted, reflected, refracted, absorbed, etc. Examples of optical films include polarizers such as reflective and absorbing polarizing films, prism films, retro-reflective films, light guides, diffusive films, brightness enhancement films, glare control films, protective films, privacy films, or a combination thereof.

The first and second optical layers may comprise any material suitable for use in the above-mentioned optical articles and depending on the particular application or device in which the article will be used. Exemplary properties include optical effectiveness over diverse portions of the ultraviolet, visible, and infrared regions, optical clarity, high index of refraction, durability, and environmental stability. Preferably, the first and second optical layers are substantially specular in that they absorb substantially no light over a predetermined wavelength region of interest; i.e., substantially all light over the region that falls on the surface of a first or second optical layer is reflected or transmitted. In general, optical layers have a high light transmission, for example, greater than about 90%, or greater than about 92%. In general, the first and second optical layers may be the same, or they may be different from each other.

Typically, the optical layers comprise a condensation or addition polymer, a blend thereof, or a polymer that is some combination thereof. Examples of condensation polymers include polyesters, polycarbonates, cellulose acetate esters, polyurethanes, polyamides, polyimides, poly(meth)acrylates, and the like. Examples of addition polymers include poly(meth)acrylates, polystyrenes, polyolefins, polypropylene, cyclic olefins, epoxies, polyvinyl chloride, polyvinylidene fluoride, polyethers, cellulose acetates, polyethersulfone, polysulfone, fluorinated ethylenepropylene (FEP), and the like.

In some cases, such as for an optical layer having a microstructured surface as described below, the layer may be made by coating a flowable composition onto a microstructured tool or liner and then hardening the composition. For example, the flowable composition may be radiation curable and comprise a reactive diluent, oligomer, crosslinker, and an optional photoinitiator which are hardened or cured by application of UV, electron beam, or some other kind of radiation after coating onto the microstructured tool or liner. For another example, the flowable composition may be a composition that is made flowable at an elevated temperature and then cooled after coating onto the microstructured tool or liner. Examples of useful radiation curable compositions are described below for a microstructured layer.

Figure 4:
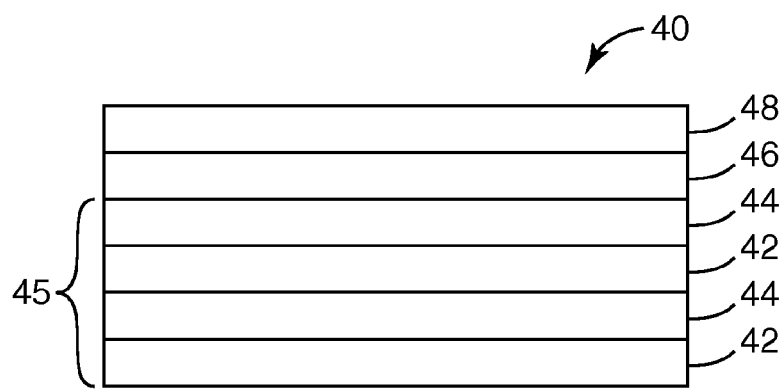
FIG. 4 shows a schematic cross-section of an exemplary optical article comprising a multilayer optical film.

The first and/or second optical layers may comprise multilayer optical films such as polarizers which are often used in display devices for increasing the brightness of the display. In general, multilayer optical films such as reflective polarizers comprise hundreds of alternating layers of two different polymeric materials. FIG. 4 shows a schematic cross-section of an exemplary optical article 40 comprising first optical layer 45, shown as a multilayer optical film having alternating layers 42 and 44. Also present is second optical layer 48 and antistatic layer 46 which is disposed between the first and second optical layers 45 and 48.

Materials used in multilayer optical films include crystalline, semi-crystalline, or amorphous polymers such as, for example, PEN/co-PEN, PET/co-PEN, PEN/sPS, PET/sPS, PEN/ESTAR, PET/ESTAR, PEN/EDCEL, PET/EDCEL, PEN/THV, and PEN/co-PET wherein PEN is polyethylene naphthalate, co-PEN comprises a copolymer or blend based upon naphthalene dicarboxylic acid, PET comprises polyethylene terphthalate, sPS comprises syndiotactic polystyrene, and ESTAR comprises a polycyclohexanedimethylene terephthalate from Eastman Chemical Co., EDCEL comprises a thermoplastic polymer from Eastman Chemical Col, THV is a fluoropolymer from 3M Company, and co-PET comprises a copolymer or blend based upon terephthalic acid. The entire thickness of the multilayer optical film is desirably from 5 to 2,000 μm.

Multilayer optical films are described in U.S. Pat. Nos. 5,882,774; 5,828,488; 5,783,120; 6,080,467; 6,368,699 B1; 6,827,886 B2; U.S. 2005/0024558 A1; U.S. Pat. Nos. 5,825,543; 5,867,316; or 5,751,388; or 5,540,978. Examples include any of the dual brightness enhancement film (DBEF)

products or any of the diffusely reflective polarizing film (DRPF) products available from 3M Company under the Vikuiti™ brand, including DBEF-D200 and DBEF-D440 multilayer reflective polarizers.

The relative positions of the antistatic layer and the optical layers can be such that the components of the antistatic layer are, for example, buried, sandwiched, covered, overcoated, or overlayed. As such, the optical article may be made using any of several known processes such as extrusion, coextrusion, coating, and lamination. For example, the antistat layer may be formed by coating the dispersion onto the first or second optical layer using techniques such as hand coating (for example, using a Mayer bar), dip coating, spin coating, roll coating, spray coating, printing, painting, and the like. Once the dispersion is applied, it can be dried either at room temperature or at an elevated temperature up to about 150° C.

The antistat layer may be in substantial contact with the first and/or second optical layers. Substantial contact means that no other material (such as air voids) is present between the antistatic layer and the optical layers. The surfaces of the first and/or second optical layers may be primed in order to enhance interlayer adhesion in the final construction. Examples of priming include chemical methods such as application of polymeric primer coatings, or physical methods such as exposure to corona discharge, plasma, flash lamp, or flame treatment.

Figure 2A:
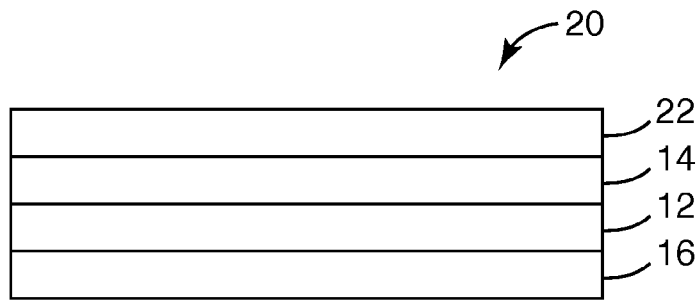
FIGS. 2a-2c each show a schematic cross-section of an exemplary optical article having one or more additional layers.
Figure 2B:
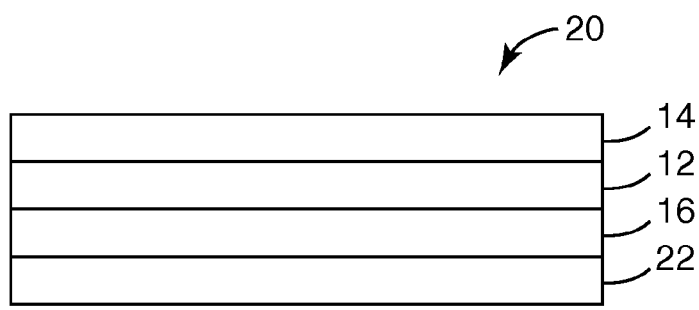
Figure 2C:
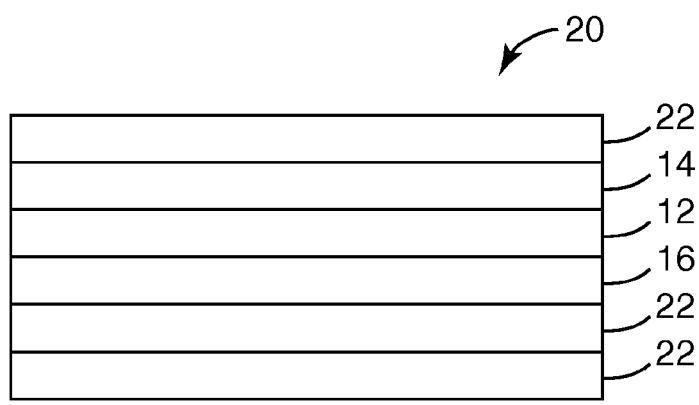

The optical article may comprise one or more additional layers on one or both of the first and second optical layers. In FIG. 2a, optical article 20 comprises additional layer 22 disposed on first layer 14. In FIG. 2b, additional layer 22 is disposed on second layer 16. In FIG. 2c, additional layer 22 is disposed on first optical layer 14 and two additional layers 22 are disposed on second layer 16. Any number of additional layers may be used, and they may all be the same or different from each other, or some may be the same and some different.

The one or more additional layers may be or comprise a diffusive layer, a matte layer, abrasion resistant layer, a layer for chemical or UV protection, support layer, magnetic shield layer, adhesive layer, primer layer, skin layer, dichroic polarizer layer, or combinations thereof. Examples of useful support layers include polycarbonate, polyester, acrylic, metal, or glass. The one or more additional layers may be extruded with other layers of the optical article, coated, or laminated.

The optical article disclosed herein may comprise a brightness enhancement film, such as those used in display devices for increasing the brightness of the display. These optical articles recycle light through a process of reflection and refraction that ultimately helps to direct light toward a viewer (usually positioned directly in front of the display device) that would otherwise leave the screen at a high angle, missing the viewer. A comprehensive discussion of the behavior of light in a brightness enhancement film may be found, for example, in U.S. Ser. No. 11/283307. Examples include the Vikuiti™ BEFII and BEFIII family of prismatic films available from 3M Company, St. Paul, Minn., including BEFII 90/24, BEFII 90/50, BEFIIM 90/50, and BEFIIIT. Brightness enhancement films can act as retro-reflecting films or elements for use therewith.

Figure 3:
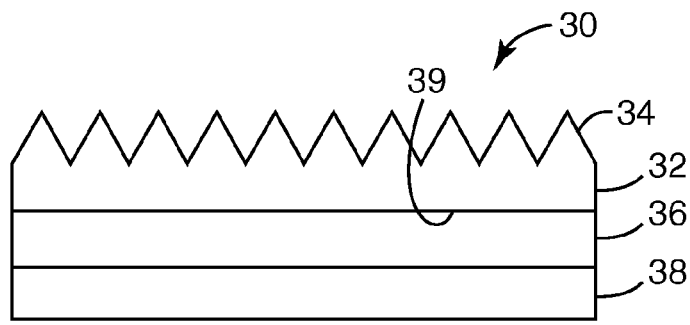
FIG. 3 shows a schematic cross-section of an exemplary optical article comprising a brightness enhancement film.

FIG. 3 shows a schematic cross-section of an exemplary brightness enhancement film 30 comprising first optical layer 32 having microstructured surface 34, antistatic layer 36, and second optical layer 38. The microstructured surface comprises an array of prisms for directing light as described above. The microstructured surface may also comprise, for example, a series of shapes including ridges, posts, pyramids, hemispheres and cones, and/or they may be protrusions or depressions having flat, pointed, truncated, or rounded parts, any of which may have angled or perpendicular sides relative to the plane of the surface. Any lenticular microstructure may be useful, for example, the microstructured surface may comprise cube corner elements, each having three mutually substantially perpendicular optical faces that typically intersect at a single reference point, or apex. The microstructured surface may have a regularly repeating pattern, be random, or a combination thereof. In general, the microstructured surface comprises one or more features, each feature having at least two lateral dimensions (i.e. dimensions in the plane of the film) less than 2 mm.

Surface 39, opposite the microstructured surface, is generally planar and may be smooth (any structures thereon are small in comparison to the size of the structures on the microstructured surface) or matte to help hide any structure of a backlight positioned behind the brightness enhancement film 30, as described below for a display device.

The microstructured layer may be prepared using a polymerizable composition, a master having a negative microstructured molding surface, and a preformed second optical layer sometimes referred to as a base layer. The polymerizable composition is deposited between the master and the second optical layer, either one of which is flexible, and a bead of the composition is moved so that the composition fills the microstructures of the master. The polymerizable composition is polymerized to form the layer and is then separated from the master. The master can be metallic, such as nickel, nickel-plated copper or brass, or can be a thermoplastic material that is stable under polymerizing conditions and that preferably has a surface energy that permits clean removal of the polymerized layer from the master. The microstructured layer may have a thickness of from about 10 to about 200 um.

The polymerizable composition may comprise monomers including mono-, di-, or higher functional monomers, and/or oligomers, and preferably, those having a high index of refraction, for example, greater than about 1.4 or greater than about 1.5. The monomers and/or oligomers may be polymerizable using UV radiation. Suitable materials include (meth) acrylates, halogenated derivatives, telechelic derivatives, and the like, and as described in U.S. Pat. Nos. 4,568,445; 4,721, 377; 4,812,032; 5,424,339; and U.S. Pat. No. 6,355,754; all incorporated by reference herein. A preferable polymerizable composition is described in U.S. Ser. No. 10/747985, filed on Dec. 30, 2003, and which is incorporated herein by reference. This polymerizable composition comprises a first monomer comprising a major portion of 2-propenoic acid, (1-methylethylidene)bis [(2,6-dibromo-4,1-phenylene)oxy(2-hydroxy-3,1-propanediyl)]ester; pentaerythritol tri(meth)acrylate; and phenoxyethyl(meth)acrylate.

The particular choice of materials used for the polymerizable composition will depend upon the method used to form the microstructured layer, for example, viscosity may be an important factor. The particular application in which the brightness enhancement film will be employed may also be considered, for example, the film needs to have particular optical properties yet be physically and chemically durable over time.

The second optical layer in a brightness enhancement film may be described as a base layer. This layer may comprise any material suitable for use in an optical product, i.e., one that is optically clear and designed to control the flow of light. Depending on the particular application, the second optical layer may need to be structurally strong enough so that the brightness enhancement film may be assembled into an optical device. Preferably, the second optical layer adheres well to the first optical layer and is sufficiently resistant to temperature and aging such that performance of the optical device is not compromised over time. Materials useful for the second optical layer include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(methyl)acrylates such as polymethylmethacrylate; polyurethanes; polyvinyl chloride; polycyclo-olefins; polyimides; glass; or combinations or blends thereof. The second optical layer may also comprise a multi-layered optical film as described above and in U.S. Pat. No. 6,111,696 which is incorporated herein by reference.

Figure 5:
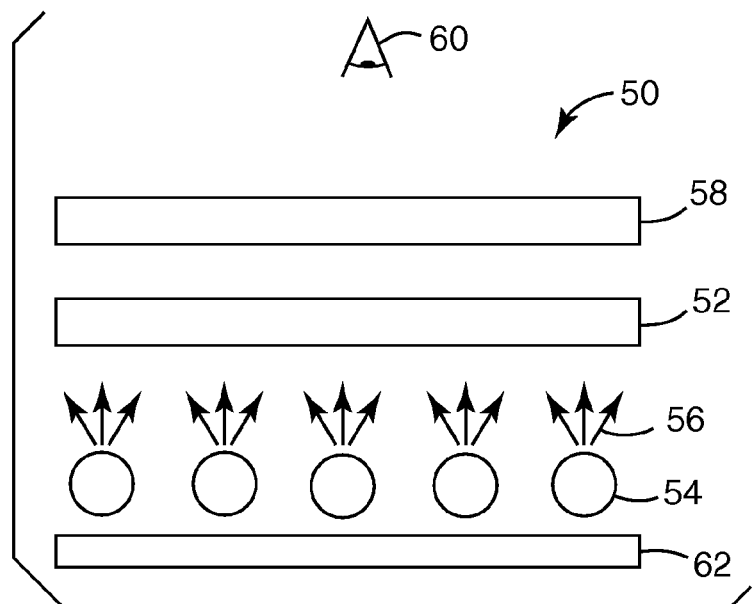
FIG. 5 shows a schematic cross-section of an exemplary display device.

FIG. 5 shows a schematic cross-section of an exemplary display device 50 comprising the optical article 52 disclosed herein. In general, light source 54 emits light, depicted by rays 56, that propagates through optical article 52 and illuminates display panel 58 making an image or graphic visible for one or more viewers 60 disposed on the opposite side thereof.

Display panel 58 may comprise any type of display that is capable of producing images, graphics, text, etc. In some display devices, images, graphics, text, etc. may be produced from an array of typically thousands or millions of individual picture elements (pixels) that may substantially fill the lateral extent (length and width) of the display panel. The array of pixels may be organized in groups of multicolored pixels (such as red/green/blue pixels, red/green/blue/white pixels, and the like) so that the displayed image is polychromatic. The pixels may also be such that the displayed image is monochromatic. In one embodiment, display panel 58 is an LCD panel which typically comprises a layer of liquid crystalline material disposed between two glass plates, and a controller is used to activate selectively the pixels such that the images, graphics, text, etc. are viewable on the side of the display panel opposite light source 54.

In general, light source 54 may comprise any type and/or configuration of light source typically used in display devices. For example, light source 54 may comprise one or more cold cathode fluorescent lamps (CCFLs), hot cathode fluorescent lamps, incandescent lamps, electroluminescent lights, phosphorescent lights, light emitting diodes (LEDs), or combinations thereof. Light emitted by light source 54 may be white, red, green, or blue, for example, or some combination thereof.

Light source 54 may be disposed directly behind the display device in what is known as a direct-lit configuration. Alternatively, an edge-lit configuration may be used wherein the light source is disposed along an edge of the display device with a light guide positioned to guide light to directly behind the display panel. When one or more light sources is used, they may be disposed in rows, e.g., along reflective strips of material, or they may be disposed in rings, modules, hexagonal lattice arrays, at random, or some combination thereof. In some cases, the light source may comprise one or more LEDs, such as an array of twenty or hundreds of LEDs. In any case, the number of light sources, the spacing between them, and their placement relative to other components in display device 50 can be selected as desired depending on design criteria such as power budget, thermal considerations, size constraints, cost, and so forth.

Back reflector 62 is disposed behind light source 54 to form a light recycling cavity within which light can undergo successive reflections until it is able to propagate towards the display panel. For optimum illumination and efficiency, it is typically advantageous for back reflector 62 to have overall high reflectivity and low absorption. Back reflector 62 may be a specular reflector, for example, the multilayer polymeric films available as Vikuiti™ ESR from 3M Company, and aluminum reflector sheets such as MIRO® products available from Alanod Aluminum-Veredlung GmbH & Co. Back reflector 62 may be a diffuse reflector comprising a pressed cake or tile of a white inorganic compound, or a polymeric article loaded with diffusely reflective particles, air-filled voids, or having polymer domains formed by thermally induced phase separation.

Examples of display devices include laptop computers, computer monitors, hand-held devices such as cell phones and calculators, digital watches, televisions, and the like.

EXAMPLES

Example 1

A vanadium oxide colloidal dispersion was prepared as described in U.S. Pat. No. 5,427,835 and diluted with deionized water to give 0.01 wt % concentration. Tergitol® TMN-6 (surfactant from Dow Chemical) was added at 0.1 wt. % to aid coatability. The dispersion was then coated using a No. 3 wire-wound rod on primed 5 mil PET film (prepared according to Example 29 of U.S. Pat. No. 6,893,731 B2). The coated film was then dried in an oven at 100° C. for 3 minutes and cooled to room temperature to give a total final dry vanadia coating thickness of 0.2 nm. Surface resistivity was then measured using an Electro-Tech Systems, Inc. Model 880 Autoranging Resistance Indicator which outputs values in decades.

A radiation-curable composition as described in U.S. Ser. No. 10/747985 was prepared by combining a first monomer comprising a major portion of 2-propenoic acid, (1-methylethylidene)bis[(2,6-dibromo-4,1-phenylene)oxy(2-hydroxy-3,1-propanediyl)]ester; pentaerythritol tri(meth)acrylate; and phenoxyethyl(meth)acrylate. This composition was coated over the vanadium oxide layer and cured using a UV Fusion Lighthammer equipped with a D bulb and operating at 100% power and 20 ft/min line speed under nitrogen purging.

The following procedure was used:

Heat the resin at 60° C. for 1 hr until liquefied.
Heat an unpatterned stainless steel BEF tool on a hot plate at 150° C.
Heat a PL1200 laminator to ~70° C. and set speed to 12 in/min (setting #2.)
Apply a bead line of BEF resin to the tool.
Using a hand roller, gently place the coated side of the PET film against the tool and roll to tack in place.
Sandwich the tool+film sample between two larger pieces of unprimed PET film to protect the laminator rolls.
Run sample through the laminator. This gives a total resin film thickness of 0.4 mil.
Pass sample twice through the UV processor.
Gently remove film sample from tool.

Charge decay time was measured using an Electro-Tech Systems, Inc. Model 406C static decay meter by charging the sample to 5 kV and measuring the time required for the static charge to decay to 10% of its initial value. Adhesion of the cured layer to the PET film was measured according to ASTM D 3359, a crosshatch tape pull test using 3M™ 610 cellophane tape (available from 3M Company). Ratings were on a scale of 0-5 with 5 being perfect adhesion and 0 being complete delamination. Results are shown in Table 2.

Example 2

Example 2 was prepared and evaluated as described in Example 1 except that the vanadium oxide had a thickness of 0.5 nm.

Comparative Examples 1-12

Comparative Examples 1-12 were prepared and evaluated as described in Example 1 except that the commercially available dispersions listed in Table 1 were used instead of the vanadium oxide dispersion. The dispersions were used as received from the supplier and coated to give dry thicknesses as shown in Table 2.

Control Example

The Control Example was prepared as described in Example 1 except that the vanadium oxide dispersion was not used, that is, the radiation-curable composition was coated directly onto the primed surface of the PET film.

TABLE 1

| Colloid | Commercial Product Designation | Supplier | Density[1] (g/cc) | Conc. (wt %) |
|---|---|---|---|---|
| $SnO_2$ ($NH_4^+$) | SN15CG | Nyacol | 6.95 | 15 |
| $SnO_2$ ($K^+$) | SN15 | Nyacol | 6.95 | 15 |
| AZO | Celnax ® ZX-330HF2 | Nissan Chemical | 5.5[2] | 30 |
| ATO | Stanostat CPM10C | Keeling & Walker | 6[2] | 19.1 |
| ITO blue | ITO Sol, Blue | Advanced Nano Products | 6.95[2] | 20 |
| ITO yellow | ITO Sol, Yellow | Advanced Nano Products | 6.95[2] | 20 |
| ATO 100 | ATO Sol, 100 nm | Advanced Nano Products | 6[2] | 20 |
| ATO 30 | ATO Sol, 100 nm | Advanced Nano Products | 6[2] | 20 |

[1] from the Handbook of Chemistry and Physics
[2] approximate average of the values for the single oxides

TABLE 2

| Example | Antistat Layer Est. Nominal Thickness (nm) | Colloid | Ctg. Surface Resistivity ($\Omega/\Box$) | Charge Decay Time After Resin Coating (sec) | Resin Adhesion |
|---|---|---|---|---|---|
| 1 | 0.2[1] | Vanadia | $10^8$ | 1.65 | 5 |
| 2 | 0.5[1] | Vanadia | $10^8$ | 0.02 | 5 |
| Comp. 1 | 12 | $SnO_2$ ($NH_4^+$) | $10^{11}$ | >30 | 2 |
| Comp. 2 | 25 | $SnO_2$ ($NH_4^+$) | $10^{10}$ | 5.25 | 4 |
| Comp. 3 | 12 | $SnO_2$ ($K^+$) | $10^9$-$10^{10}$ | 8.15 | 0 |
| Comp. 4 | 25 | $SnO_2$ ($K^+$) | $10^9$ | 7.4 | 0 |
| Comp. 5 | 16 | AZO | $10^{10}$ | >30 | 5 |
| Comp. 6 | 31 | AZO | $10^9$ | 0.01 | 3 |
| Comp. 7 | 9 | ATO | $10^{10}$ | 0.07 | 5 |
| Comp. 8 | 17 | ATO | $10^8$ | 0.01 | 5 |
| Comp. 9 | 12 | ITO blue | >$10^{12}$ | NM | NM |
| Comp. 10 | 12 | ITO yellow | >$10^{12}$ | NM | NM |
| Comp. 11 | 9 | ATO 100 | >$10^{12}$ | NM | NM |
| Comp. 12 | 7 | ATO 30 | >$10^{12}$ | NM | NM |
| Control | None | none | >$10^{12}$ | >30 | 5 |

[1] density of the vanadium oxide = 3.36 g/cc, Handbook of Chemistry and Physics
NM = not measured

Example 3

A 1 wt % solution of Triton X-100 surfactant (available from Union Carbide Corp., a subsidiary of Dow Chemical, Danbury, Conn.) was prepared by mixing and stirring 0.32 g surfactant and 31.68 g deionized water in a glass bottle. To this solution was then added 0.32 g multiwall carbon nanotubes (available from NanoLab Inc., Newton, Mass.) powder, and the mixture was ultrasonicated for 32 hr. The sonicated mixture was homogenized using a HandiShear homogenizer (VirTis, Gardiner, N.Y.) at rates ranging from 5000 to 30000 rpm for about two minutes. The resulting dispersion was then poured into a 45 ml centrifuge tube (VWR, Bristol, Conn.), sealed with a cap, and centrifuged for 5 min at 3600 rpm in an IEC Centra CL2 benchtop centrifuge (Thermal Electron Corp., Waltham, Mass.). The dispersion was decanted into a clean glass bottle, leaving about 8.81 g residue behind in the centrifuge tube. Thermal and gravimetric analysis of the residue after drying allowed the concentration of multiwall carbon nanotubes in the final dispersion to be estimated at 0.35 wt %.

The above dispersion of multi-walled nanotubes (density of the nanotubes=1.4 g/cc) was coated on primed PET film using a #3 wire-wound rod, and the coating was dried in a forced-air oven at 100° C. for 3 min. Surface resistivity on the dried coating was measured at $10^8$ ohm/sq. Estimated nominal thickness of the carbon nanotubes coating was 17 nm. This sample was overcoated with UV-curable resin using the material and procedure described in Example 1. Static charge decay time of the resulting construction was 0.02 sec, and resin adhesion was rated 5.

Various modifications and alterations of this invention will be apparent to those skilled in the art without departing from the scope and spirit of the invention, and it should be understood that this invention is not limited to the examples and embodiments described herein.

What is claimed is:

1. An optical article comprising:
   a first optical layer;
   a second optical layer; and
   an antistatic layer disposed between the first and second optical layers, the antistatic layer comprising conducting particles having an aspect ratio greater than about 10 and comprising single-walled carbon nanotubes having a length of 100 um or less and a diameter of 2 nm or less, wherein the antistatic layer has an average total thickness of less than about 10 nm and exhibits a surface resistivity of greater than about $1 \times 10^8$ ohms/sq.

2. The optical article of claim 1 having a charge decay time of less than about 2 seconds, wherein charge decay time is measured by the time required for static charge of the article to decay to 10% of its initial value.

3. The optical article of claim 1, the first and second optical layers having an adhesion of at least 3 according to ASTM D 3359.

4. The optical article of claim 1, at least one of the first and second optical layers comprising a microstructured surface.

5. The optical article of claim 1, at least one of the first and second optical layers comprising a multilayer optical film, the multilayer optical film comprising alternating layers of at least two different polymeric materials.

6. The optical article of claim 1, the antistatic layer in substantial contact with the first and/or second optical layers.

7. A display device comprising:
   a light source;
   a display panel; and
   the optical article of claim 1 disposed between the light source and the display panel.

8. The display device of claim 7, the display panel comprising a liquid crystal display panel.

9. The optical article of claim 1, the antistatic layer consisting essentially of the conducting particles and a surfactant.

10. The optical article of claim 9, the surfactant comprising a nonionic surfactant.

11. An optical article comprising:
    a first optical layer;
    a second optical layer; and
    an antistatic layer disposed between the first and second optical layers, the antistatic layer comprising conducting particles having an aspect ratio greater than about 10 and comprising multi-walled carbon nanotubes having a length of 100 um or less and a diameter of 30 nm or less, wherein the antistatic layer has an average total thickness of less than about 10 nm and exhibits a surface resistivity of greater than about $1 \times 10^8$ ohms/sq.

12. The optical article of claim 11 having a charge decay time of less than about 2 seconds, wherein charge decay time is measured by the time required for static charge of the article to decay to 10% of its initial value.

13. The optical article of claim 11, the first and second optical layers having an adhesion of at least 3 according to ASTM D 3359.

14. The optical article of claim 11, at least one of the first and second optical layers comprising a microstructured surface.

15. The optical article of claim 11, at least one of the first and second optical layers comprising a multilayer optical film, the multilayer optical film comprising alternating layers of at least two different polymeric materials.

16. The optical article of claim 11, the antistatic layer in substantial contact with the first and/or second optical layers.

17. A display device comprising:
    a light source;
    a display panel; and
    the optical article of claim 11 disposed between the light source and the display panel.

18. The display device of claim 17, the display panel comprising a liquid crystal display panel.

19. The optical article of claim 11, the antistatic layer consisting essentially of the conducting particles and a surfactant.

20. The optical article of claim 19, the surfactant comprising a nonionic surfactant.

* * * * *